Dec. 15, 1964
L. J. KABELL
3,161,844
SEMICONDUCTOR BEAM STRAIN GAUGE
Filed Dec. 5, 1961
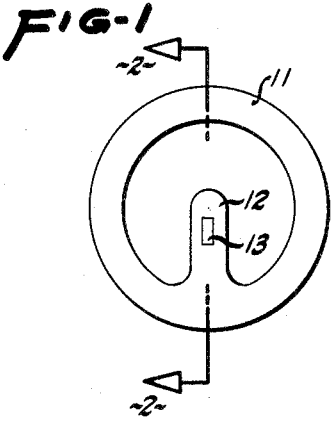
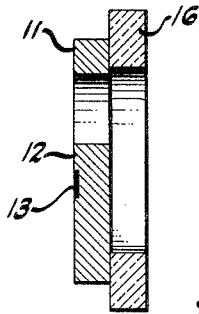
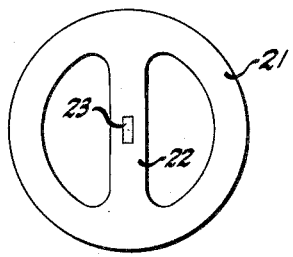
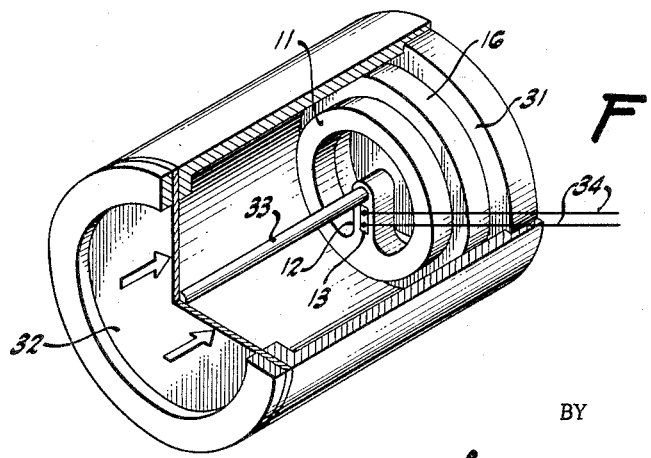
INVENTOR.
LOUIS J. KABELL
BY
*Lippincott, Ralls & Hendricson*
ATTORNEYS

United States Patent Office 3,161,844
Patented Dec. 15, 1964

3,161,844
SEMICONDUCTOR BEAM STRAIN GAUGE
Louis J. Kabell, Palo Alto, Calif., assignor to Fairchild Camera and Instrument Corporation, Syosset, N.Y., a corporation of Delaware
Filed Dec. 5, 1961, Ser. No. 157,112
1 Claim. (Cl. 338—2)

The present invention relates to an improvement in sensor mountings for motion transducers of strain gauges.

The present invention, in brief, provides a novel and improved mounting configuration for semiconductor beam sensors. In the application of semiconductor strain elements to motion transducers such as accelerometers, load cells, and pressure indicators, the strain element is commonly bonded to a mechanical member which is strained by the motion to be measured. Although various semiconducting materials have highly advantageous mechanical properties for application as the above-noted mechanical member, brittleness of the semiconducting material poses serious problems regarding the mounting or attachment of such a member.

In accordance herewith the mechanical member which is strained by the motion to be measured is formed of the same semiconducting material as the sensor itself, and prior art difficulties of anchoring the member or measuring beam are herein overcome through the provision of an integral sensing beam and base formed of a single piece of single crystal semiconducting material. The actual sensor itself is formed within the sensing beam by the diffusion of an acceptor or donor impurity therein so that the sensor itself may be quite minute and accurately dimensioned. By the provision of an integral beam and sensor base, the unit hereof precludes the application of undue stress concentration with beam deflection.

The invention hereof is illustrated in the accompanying drawing wherein:

FIGURE 1 is a plan view of a cantilever beam sensor base in accordance with the present invention;

FIGURE 2 is a sectional view taken in the plane 2—2 of FIGURE 1;

FIGURE 3 is a plan view of a crossbeam sensor base in accordance with the present invention; and FIGURE 4 is a partial perspective illustration of a pressure transducer including the present invention.

Considering now the present invention in somewhat gerater detail and referring first to the embodiment thereof illustrated in FIGURE 1, it will be seen that the unit includes an integral base ring 11 and cantilever beam 12. These elements are formed of a monocrystalline semiconducting material such as intrinsic silicon. Although it is possible for the base ring 11 to have a variety of configurations, there is illustrated in FIGURE 1 an annular ring with an integral projection 12 extending radially inwardly thereof to comrise the cantilever beam structure. At the joinder of the beam and ring there are formed fillets or rounds, as indicated, to minimize any concentration of stresses at these points.

The beam portion of the present invention is adapted to be flexed by the application of forces thereto, so that a semiconducing sensor upon the beam will be subjected to stresses proportional to the motion of the beam. With the formation of the motion sensing beam and mounting base as a single integral unit from semiconducting material, there may then be formed a sensor 13 within the beam. This sensor may be formed by the limited diffusion of a selected dopant, i.e. an acceptor or donor impurity, into one surface of the beam in a very limited volume so that the sensor has conventional semiconducting properties.

Construction of the sensor base hereof may be accomplished in a variety of ways such as, for example, the utilization of known etching techniques and ultrasonic cutting techniques. The crystalline orientation of the semiconducting material is chosen so that alignment of the sensor beam is correct either for piezoresistive diffused stripe sensors or for transverse voltage diffused sensors. Both of the foregoing types of sensors are known and reference is made, for example, to the co-pending patent application of Wendell M. Lafky, Serial No. 50,510, entitled "Semiconductor Strain Gauge." A relatively thin wafer of semiconducting material is employed as a basis for the sensor beam and base ring. The thickness of the sensor base and the thickness of the beam may be adjusted independently during formation to fit the requirements for which the particular device is intended.

Mounting of the sensor base and beam may be accomplished in a variety of ways, such as, for example, by clamping the ring to a backing piece. Alternatively, the base may be cemented to a mounting ring 16, as indicated in FIGURE 2. This mounting ring 16 is formed of a ceramic material having a temperature coefficient of expansion which is matched to that of the semiconducting material of the sensor base and beam. Alloy soldering may be employed to secure the sensor base 11 to the ring 16. The sensor base is mounted to leave the beam 12 free for deflection by the appliaction of forces thereto, and the illustrated manner of mounting is only exemplary in this respect.

Various different embodiments of the present invention are possible and there is illustrated in FIGURE 3 one alternative embodiment having a crossbeam configuration. As shown in FIGURE 3, the mounting base 21 has an integral web or beam 22 extending across the center thereof from one side to the other. Rounded fillets are formed at each end of the crossbeam where it extends from the mounting base in order to minimize any concentration of stresses thereat. This embodiment of the invention also includes at least one sensor 23 formed by the diffusion of a selected acceptor or donor impurity into the semiconducting material of the sensor beam. There may, of course, be formed more than one sensor in the beam and furthermore such sensors may be formed on opposite sides of the beam in order to obtain an additive effect with appropriate electrical connections to the sensors. In this embodiment the integral sensor base and beam are formed of monocrystalline semiconducting material such as silicon and the process of formation may be carried out with known techniques in the transistor art. The material of the sensor base and beam may, for example, comprise extrinsic semiconducting material of a predetermined polarity. Thus, for example, the sensor base and beam may be formed of N-type silicon with a P-type sensor therein produced by the diffusion of acceptor impurities into a limited area of the beam. In this instance, there will be seen to be provided a P-N junction between the sensor and the sensor base. Such a junction may be employed to afford a degree of electrical isolation between the sensor and mounting means associated with the base, for example. By the application of appropriate potentials to reverse bias this junction, substantially no current will flow therethrough even though the sensor base is electrically contacted by mounting means.

The physical configuration of the sensor base hereof may be rather widely varied, and it is not necessary for the base to have a circular configuration, as illustrated. There may, for example, be employed an oval base configuration or even a semicircular base configuration, however, the circular configuration is advantageous in eliminating any mounting point that might contribute to hysteresis. The various configurations of the present invention wherein the beam is disposed within the sensor base are advantageous in limiting the over-all size of the unit as compared to alternative configurations, wherein the beam may extend outwardly from the base. Many transducers are quite limited in available physical space, and consequently, advantages lie in the provision of the beam internally of the base.

Motion transducers employing semiconductor strain elements may be employed in a wide variety of applications, and there is illustrated in FIGURE 4 a portion of a transducer that may, for example, be employed as a pressure transducer. The embodiment of the present invention illustrated in FIGURE 1 and mounted as indicated in FIGURE 2 is shown in FIGURE 4 as being disposed upon a backing plate or the like of a transducer. This backing plate 31 is substantially rigid so that the sensor base 11 affixed thereto by means of the mounting ring 16 has a fixed plane of reference. Some type of diaphragm 32 is provided in front of the sensing unit of the present invention and a plunger or the like 33 extends from the center of this diaphragm into engagement with the cantilever beam 12. Application of a pressure to the diaphragm, which is fixedly mounted about the edges thereof, will cause deflection of the diaphragm to thereby press the plunger 33 against the cantilever beam 12, and consequently, to deflect the beam. The application of this pressure, as indicated by the arrows in FIGURE 4, will thus stress the sensor 13 in the deflected beam.

There may be employed either piezoresistive effects or transverse voltage effects in the sensor to produce output variations proportional to strains set up in the sensor as a result of the beam deflection. Electrical leads 34 are joined to ohmic contacts spaced apart upon the sensor 13, and these leads extend to suitable indicating circuitry, not shown. Strain gauge circuitry is known in the art, and a variety of different energization and indicating circuits may be employed in connection with a semiconducting sensor element. The transducer may be quite conventional as regards associated circuitry and general construction. Known proportionality factors are employed to obtain pressure measurements from the changes in electrical properties of the sensor.

The transducer illustrated in part in FIGURE 4 is only exemplary of a wide variety of applications of the present invention. The invention hereof provides a material advancement in the field of motion transducers, for the prior art problems of employing semiconductor measuring beams are entirely overcome hereby. As previously stated, semiconducting materials such as silicon, in particular, exhibit ideal mechanical properties for application as a motion sensor. Such materials are not, however, readily mounted, inasmuch as the normal concentration of stresses at the mounting area cannot be handled by the material. The brittleness of silicon, for example, poses serious difficulties in this respect. The present invention provides an integral single crystal structure, wherein the sensor base and motion sensor or measuring beam are formed as one single unit from monocrystalline semiconducting material. In this manner the beam is anchored without subjecting the beam to undue stress concentrations when deflected by the motion to be measured.

It is not intended to limit the present invention by the terms of the foregoing description of particular preferred embodiments of the present invention nor by the details of the illustrations thereof, but instead reference is made to the following claim for a precise delineation of the true scope of the present invention.

What is claimed is:

A semiconductor strain gauge comprising a single integral flat piece of monocrystalline semiconducting material divided into two portions with openings therebetween, one portion being a linear portion extending interiorly from a second larger base portion, said base portion surrounding said linear portion, and at least said linear portion having a substantially uniform doping of impurities of one conductivity type; a sensor region diffused into and surrounded by said linear portion, said sensor region having a predominance of impurities of the opposite conductivity type, whereby a PN junction is formed between said sensor region and said linear portion; spaced-apart contact means for making contact with two points on the surface of said sensor, whereby deflection of said linear portion by external forces stresses said sensor to vary its electrical properties in such manner that these variations in electrical properties, measured across said contact means, are proportional to and thus an indication of the magnitude of said forces, said variations being enhanced by the provision of said openings between said portions.

References Cited by the Examiner

UNITED STATES PATENTS

| | | | |
|---|---|---|---|
| 2,266,608 | 12/41 | Kuehni. | |
| 2,442,938 | 6/48 | Ruge | 73—398 |
| 2,472,047 | 5/49 | Ruge. | |
| 2,858,400 | 10/58 | Statham | 73—88 |
| 2,979,680 | 4/61 | Bean | 73—398 |
| 3,049,685 | 8/62 | Wright | 73—88 |

RICHARD C. QUEISSER, *Primary Examiner.*

DAVID SCHONBERG, *Examiner.*